United States Patent Office 3,032,196
Patented May 1, 1962

3,032,196
ORE BENEFICIATION PROCESS
Ingmar Sollin, Morton Grove, Ill., assignor to International Minerals & Chemical Corporation, a corporation of New York
No Drawing. Filed Dec. 9, 1957, Ser. No. 701,336
10 Claims. (Cl. 209—166)

The present invention relates to the beneficiation or concentration of ores. More particularly, the present invention relates to a process of beneficiating or concentrating phosphatic ores, or phosphorus-containing material. In general, the process of the present invention is applicable to beneficiation of any non-metallic ore such as, for example, apatite, fluorapatite, sylvite, langbeinite, fluorspar, feldspar, and the like.

Apatite and fluorapatite, which are crude phosphatic materials or minerals, occur widely in nature and are generally thought to be chiefly tricalcium phosphate coupled with other minerals such as quartz, silicates, calcium carbonate, and the like, all of which, of course, contain no phosphorus and are of little, if any, nutritive value so far as plants and animals are directly concerned. Such materials, in addition, contain traces or minor quantities of heavy metals, heavy metal salt oxides, such as ferric oxide, alumina, and the like.

Many methods have been devised in the past for treating such ores to effect beneficiation or concentration of the phosphatic constituents by removing the siliceous, carbonaceous, and heavy metal constituents therefrom. Several methods involve the desliming, dewatering and separation of either pulped or unpulped material in order to effect this beneficiation and concentration. One commonly used method involves the reagentizing and flotation of dewatered ore with a collecting agent used in conjunction with a relatively high boiling hydrocarbon oil or liquid, together with the use of a basic component such as caustic. When an aqueous suspension or pulped phosphatic rock is reagentized with a composition containing the combination and the same agitated and aerated in an aqueous suspension, the phosphatic values and components of the rock are found to rise and become segregated in the upper portion of such suspension while the siliceous values are found to settle or deposit in the lower portion of such a suspension. The beneficiated or enriched phosphatic material is withdrawn and may be further treated by re-flotation for further beneficiating the phosphate ore, and the material so segregated is either subjected to acid treatment for the production of superphosphate, or is ground and sold as raw, enriched phosphate rock having 60 to 75%, and even as high as 80%, of tricalcium phosphate computed as bone phosphate of lime (B.P.L.).

Various methods of operating beneficiating and concentrating processes of the flotation type to improve the recovery and the grade of the phosphate in the beneficiation product have been attempted in the past. Some of the factors which control the recovery and grade of phosphate in the beneficiation product are the properties of the ore, the pH of the slurry, the type and quantity of reagents, and the type and quantity of "aeration." Because of the large scale character of the business of producing phosphate rock concentrates, and the highly competitive market existing in such a business, it is important that the reagentizing composition used be relatively inexpensive. Great effort has been expended to discover collecting agents which will be more efficacious, yet which may cost even less than those heretofore employed. It is, however, not alone desirable to employ a collector which may be used in smaller quantities to effect an efficient segregation of the phosphatic values, but it is also important that the values recovered be of a relatively high purity and relatively free of solids other than the desired phosphatic material.

It is an object of the present invention to provide a new reagent for use in an ore beneficiation process.

It is another object of the present invention to provide an improved process of beneficiating and concentrating ores.

It is a further object of this invention to provide an improved process of beneficiating and concentrating phosphatic ores.

It is a further object of this invention to provide an improved process of beneficiating or concentrating phosphatic ores by a froth flotation method.

It is a further object of this invention to treat a phosphatic ore with a new flotation agent so as to improve the efficiency of selectively reagentizing and floating the phosphatic components to the exclusion of the gangue.

It is a still further object of this invention to subject phosphatic ores to froth flotation and to collect a concentrate having a high percentage of tricalcium phosphate.

These and other objects of the invention will be apparent to those skilled in the art as the description of the invention progresses.

The reagentizing of phosphatic ores or phosphorus-bearing materials for the purpose of beneficiating and concentrating these phosphatic values has been practiced for many years. The present invention is directed to the discovery of and use of an improved reagentizing composition for this purpose.

Once the phosphatic material, such as Montana or Tennesse rock, or Florida pebble phosphate, has been sized to about —1 mm. more or less, and if desired, washed with water to remove slimes and dewatered in a classifier to separate water from the rock, the material is reagentized with the novel composition herein described.

It has been discovered that the material resulting from a treatment of a residue remaining after a vegetable oil distillation with a strong base contains certain beneficial values which are the subject matter of this invention. It is not known exactly what the specific chemical composition of these values are. However, it has been discovered that the base treated residue does accomplish the desired results for the beneficiation of phosphatic materials when used in conjunction with other substances conventionally employed in such reagentizing operation. The residues without the base treatment are not effective reagentizing materials.

The term "vegetable oil residue" is used herein and in the appended claims to distinguish from vegetable oils which have been purified by various physical and/or chemical means which are familiar to those skilled in the vegetable oil art. Specifically, the term "vegetable oil residue" means the residue remaining when a crude vegetable oil is subjected to distillation. In the distillation, a vegetable oil is distilled overhead and the "vegetable oil residue" remains. The material remaining after about 50% by volume of the crude vegetable oil charge is distilled over, is a "vegetable oil residue" within the meaning of this invention. It is preferred, however, that at least 70% by volume, and still more preferably at least 75% by volume of the crude vegetable oil be distilled out to leave as a residue the preferred vegetable oil residue to be treated in accordance with this invention.

The distillation may be a pressure, atmospheric, vacuum, or steam distillation. The residue may be known in the art as residue, pitch, bottoms, foots, or by other means. Examples of suitable vegetable oil residues are tall oil pitch, soya oil pitch, fatty acid pitch, and cotton seed pitch. These examples are considered to be merely exemplary, and not all-inclusive of the types of "residues" which are applicable for the production of the base treated residue, which is an essential ingredient of the reagentizing composition.

In addition to the essential values of the base treated vegetable oil residue, the reagentizing composition also contains a basic material such as caustic soda, soda ash, KOH, or the like, in order to regulate the pH of the suspension or pulped slurry above 7.0 and preferably between about 8.0 and about 9.0. It is usually necessary to add the basic material to the reagentizing composition to obtain the desired pH. However, in the event that a sufficient excess of base is used in the base treatment of the vegetable oil residue to give the desired pH in the final reagentizing composition, it is not usually necessary to add additional basic material.

Still a third component of the reagentizing composition is a liquid hydrocarbon component which is liquid under the conditions obtaining. Suitable substances in this category are diesel oil, fuel oil, kerosene, the heavier solvent naphthas, crude oil, and the like, as well as mixtures of two or more of these liquid hydrocarbon components.

Each of the three above specified components of the reagentizing composition may be added separately or they may be added as a previously prepared admixture to the dewatered phosphatic material.

The required base treated vegetable oil residue may be prepared by the base treatment of one or more vegetable oil residues. The base treatment may be performed in any suitable manner. One method is to mix the vegetable oil residue with a strong base and to agitate the mixture. A preferred method is to first mix the vegetable oil residue with a liquid hydrocarbon component, which component was hereinbefore described, and to then contact the mixture with a strong base. It appears that the base treatment of the vegetable oil residue is a base hydrolysis and, therefore, the resultant composition may be termed a base hydrolyzed vegetable oil residue.

Sodium hydroxide is a preferred base to use for treating the vegetable oil residue since it is a relatively strong and inexpensive base and the resultant reagentizing composition is very efficient. Other suitable strong bases which will effect hydrolysis of a vegetable oil residue may also be used, for example, potassium hydroxide, lithium hydroxide, etc. The treatment is preferably with a concentrated strong base, however, a dilute base may also be used. When a dilute base is used, it is preferred that the treatment of the vegetable oil residue with the dilute base be at an elevated temperature.

The mixture of base and vegetable oil residue, which may also have a liquid hydrocarbon component therein, is preferably agitated to insure uniform treatment of the residue. The time of treatment, the temperature and other variable depend to an extent upon the particular base used and the concentration, as is indicated above. The base hydrolysis of the residue appears to occur rather rapidly when a concentrated strong base is used. In general, the usual conditions for a base hydrolysis of a heavy oil have been found to be suitable. In the base treatment of the vegetable oil residue, it is preferable to use an amount of base which will effect a substantial amount of hydrolysis of the vegetable oil residue and it is still more preferable to use an excess of base in order to achieve as much hydrolysis as possible under the treating conditions.

As hereinabove set forth, the base treated vegetable oil residue, the liquid hydrocarbon component, and the added basic material to obtain the desired pH, may be added separately or they may be added as a previously prepared admixture to the dewatered phosphatic ore. Also, it is possible to obtain substantial results in beneficiating the phosphatic ore, if the hydrocarbon component of the reagentizing composition is omitted entirely.

A typical composition is as follows, the amounts being in pounds per ton of dewatered ore treated:

A. Base treated vegetable oil residue in an amount between about 0.5 and about 3.0.

B. Diesel or fuel oil in conventional amounts usually between about 0.1 and about 6.0.

C. Caustic soda or any other suitable basic material in conventional amounts, usually between 0.2 and about 1.5, this amount including any excess base used in the treatment of the vegetable oil residue.

A phosphatic ore reagentized with a composition as above described may be subjected to a separation or segregation step, or sequence of such steps in a number of ways, all of which effect a marked beneficiation or concentration of the desired phosphatic values of the ore. Such a reagentized feed may be treated by slurrying in water to form an aqueous suspension, aerating the suspension, and allowing the froth layer and agglomerate layer to collect at the top of the flotation cell while siliceous and other impurities and less desired values sink to the bottom of the cell. In this manner the floated phosphatic values are segregated from the siliceous bodies and the like. The concentrate or partially concentrated phosphatic material may then be subjected to a further flotation or series of flotation steps employing the same reagentizing composition or a different one to further beneficiate the phosphatic values. One of the advantages in the use of the instant reagentizing composition is that it is easily broken up and defrothed after flotation has been completed. This is accomplished by treating the floated phosphatic values with sulfuric acid to remove the oil and other reagents adhering to the phosphatic values.

A further concentration and beneficiation of the phosphatic values segregated in the froth layer of the flotation cell may be effected as above stated in the conventional manner to obtain the desired degree of concentration of the B.P.L. (bone phosphate of lime) content of the material.

The novel reagentizing composition may also be applied in processes designed to beneficiate or concentrate phosphatic ores and other ores previously mentioned in which flotation steps are not involved. Thus, for example, the reagentized phosphatic feed, either as an orginal or intermediate step in the benficiation, may be subjected to a tabling operation of conventional design to allow the collection and segregation of phosphatic material on the one hand, and siliceous and heavy mineral bodies on the other hand. Also, it has been discovered that phosphatic material reagentized with the novel composition herein set forth may be successfully beneficiated as to its phosphatic content by contacting such reagentized feed in a downwardly spiralling path so as to permit the phosphatic material to be selectively centrifugally moved to the outer portion of the spiral pathway, while the siliceous bodies and other impurities are collected from the inner portion of the spiral pathway.

As illustrative of the character of the instant invention, but in no wise intending to be limited thereby, the following examples are given:

EXAMPLES

In the following examples, each run was carried out under the same set of standard conditions of treatment and involved the same amounts of ore or rock and the like, and except as indicated in the table, all conditions, reagents and treatments remained constant so that a set of strictly comparable results were obtained with the exception noted in the table.

In each instance 1000 grams of Florida pebble rock of about −28 mesh was deslimed and dewatered to about 80% solids, placed in the mixing chamber with reagent, and agitated for about one minute. The treated mixture was then diluted with water, placed in a flotation cell and agitated for about two minutes with the various types of reagents in the amounts specified below.

The tall oil pitch used in Examples 1 and 2 was obtained from the Arizona Chemical Company, Inc. which sells the product under the name Actinol "P" Tall Oil Pitch. The tall oil pitch used in Examples 3 and 4 was obtained from the West Virginia Pulp and Paper Company which sells the product under the name "Tallene" Tall Oil Pitch.

The flotation reagents for Examples 1 and 3 were prepared by mixing 10 parts by weight of the tall oil pitch with 20 parts by weight of Bunker "C" petroleum oil and 10 parts by weight of kerosene. The mixture was emulsified and diluted with water so that each ml. of solution corresponded to 1/10 lb. of reagent per ton of ore (dry basis) used.

The flotation reagents for Examples 2 and 4 were prepared by mixing 10 parts by weight of the tall oil pitch with 20 parts by weight of Bunker "C" petroleum oil and 10 parts by weight of kerosene. The mixture was hydrolyzed with 16 parts by weight of a 50% aqueous solution of NaOH by heating at atmospheric pressure at the reflux temperature of about 100° C. for one hour. The hydrolyzed mixture was cooled and the pH of the solution was adjusted to 10.5 with dilute sulfuric acid. The hydrolyzed mixture was then emulsified and diluted with water so that each ml. of solution corresponded to 1/10 lb. of reagent per ton of ore (dry basis) used.

In accordance with flotation beneficiation practice, sodium hydroxide solution was also added to the dewatered ore in the amounts shown in the table.

Table

| Example No. | 1 | 2 | 3 | 4 |
|---|---|---|---|---|
| Collector Used | Tall Oil Pitch (Actinol) | Base Hydrolyzed Tall Oil Pitch (Actinol) | Tall Oil Pitch (Tallene) | Base Hydrolyzed Tall Oil Pitch (Tallene) |
| Flotation Reagent, lbs./ton | 1.0 | 1.0 | 1.0 | 1.0 |
| NaOH, lbs./ton | 0.5 | 0.5 | 0.5 | 0.5 |
| B.P.L. in Feed, Wt. Percent | 29.7 | 29.7 | 29.7 | 29.7 |
| Product: | | | | |
| Recovered, Wt. Percent | (¹) | 42.1 | (¹) | 34.5 |
| B.P.L., Wt. Percent | (¹) | 52.2 | (¹) | 65.5 |
| B.P.L. Recovered Wt. Percent | (¹) | 80.2 | (¹) | 88.0 |

¹ No flotation.

Examples 1 and 3 illustrate that a pitch which has not been treated with a base is not an effective flotation reagent.

Examples 2 and 4 illustrate the use of base hydrolyzed tall oil pitches in flotation reagents. In Examples 2 and 4 high recoveries of a high purity product were effected.

These examples illustrate the utility of the base treated vegetable oil residues in a flotation ore beneficiation process. In each case a high yield and high purity of product was obtained.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

1. A reagent for use in a process for beneficiating non-metallic ores which reagent comprises the product resulting from the treatment with a strong base, under conditions effective to substantially hydrolyze, of a vegetable oil pitch obtained after distilling over of at least 50% by volume of a crude vegetable oil.

2. A reagent for use in a process for beneficiating non-metallic ores which comprises the product resulting from the treatment with sodium hydroxide solution, under conditions effective to substantially hydrolyze, of a tall oil pitch obtained after distilling over of at least 50% by volume of a crude tall oil.

3. A reagent for use in a process for beneficiating non-metallic ores which comprises the product resulting from the treatment with sodium hydroxide solution, under conditions effective to substantially hydrolyze, of a soya oil pitch obtained after distilling over of at least 50% by volume of a crude soya oil.

4. A reagent for use in a process for beneficiating non-metallic ores which reagent comprises the product resulting from the treatment with a strong base, under conditions effective to substantially hydrolyze, of a vegetable oil pitch obtained after distilling over of at least 70% by volume of a crude vegetable oil.

5. An ore flotation process which comprises agitating and aerating an aqueous suspension of a non-metallic ore in a finely divided state in admixture with the product resulting from the treatment with a strong base, under conditions to substantially hydrolyze, of a vegetable oil pitch obtained after the distillation over of at least 50% by volume of a crude vegetable oil.

6. An ore flotation process which comprises agitating and aerating an aqueous suspension of a non-metallic ore in a finely divided state in admixture with the product resulting from the treatment with sodium hydroxide solution, under conditions effective to substantially hydrolyze, of a tall oil pitch obtained after distillation over of at least 50% by volume of a crude tall oil.

7. An ore flotation process which comprises agitating and aerating an aqueous suspension of a non-metallic ore in a finely divided state in admixture with the product resulting from the treatment with sodium hydroxide solution, under conditions effective to substantially hydrolyze, of a soya oil pitch obtained after distilling over of at least 50% by volume of a crude soya oil.

8. An ore flotation process which comprises agitating and aerating an aqueous suspension of a non-metallic ore in a finely divided state in admixture with the product resulting from the treatment with a strong base, under conditions effective to substantially hydrolyze, of a vegetable oil pitch obtained by the distillation over at least 70% by volume of a crude vegetable oil.

9. A process for concentrating a phosphatic ore which comprises agitating and aerating an aqueous suspension of a phosphatic ore in a finely divided state in admixture with the product resulting from the treatment with a strong base, under conditions effective to substantially hydrolyze, of a vegetable oil pitch obtained after the distillation over of at least 50% by volume of a crude vegetable oil.

10. A process for concentrating a phosphatic ore which comprises agitating and aerating an aqueous suspension of a phosphatic ore in a finely divided state in admixture with the product resulting from the treatment with a strong base, under conditions effective to substantially hydrolyze, of a vegetable oil pitch obtained after the distillation over of at least 70% by volume of a crude vegetable oil.

References Cited in the file of this patent

UNITED STATES PATENTS

| 1,912,433 | Crago et al. | June 6, 1933 |
| 2,165,268 | Vogel-Jorgensen | July 11, 1939 |
| 2,216,992 | Vogel-Jorgensen | Oct. 8, 1940 |
| 2,857,331 | Hollingsworth | Oct. 21, 1958 |

OTHER REFERENCES

Soap Manufacture, vol. I, Davidson et al., Interscience, N.Y., 1953, page 14.